United States Patent
Suciu et al.

(10) Patent No.: US 10,156,206 B2
(45) Date of Patent: Dec. 18, 2018

(54) PIVOTING BLOCKER DOOR

(71) Applicant: United Technologies Corporation, Hartford, CT (US)

(72) Inventors: Gabriel L. Suciu, Glastonbury, CT (US); Brian D. Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 476 days.

(21) Appl. No.: 14/512,520

(22) Filed: Oct. 13, 2014

(65) Prior Publication Data

US 2015/0113945 A1 Apr. 30, 2015

Related U.S. Application Data

(60) Provisional application No. 61/895,262, filed on Oct. 24, 2013.

(51) Int. Cl.
| | | |
|---|---|---|
| *F02K 1/72* | (2006.01) | |
| *F02K 1/66* | (2006.01) | |
| *F02K 3/06* | (2006.01) | |
| *F02K 1/76* | (2006.01) | |

(52) U.S. Cl.
CPC ............ *F02K 1/72* (2013.01); *F02K 1/66* (2013.01); *F02K 1/763* (2013.01); *F02K 3/06* (2013.01); *F05B 2250/314* (2013.01); *F05D 2260/403* (2013.01)

(58) Field of Classification Search
CPC . F02K 1/72; F02K 1/763; F02K 1/766; F02K 3/06; F02K 3/068; F02K 1/66; F01D 13/006; F01D 13/003; B64D 2033/0286; F02C 7/36; F05D 2250/313; F05D 2250/314

See application file for complete search history.

(56) References Cited

U.S. PATENT DOCUMENTS

| | | | | |
|---|---|---|---|---|
| 4,005,574 | A | | 2/1977 | Smith, Jr. |
| 4,220,171 | A | * | 9/1980 | Ruehr .................. B64D 33/02 137/15.1 |
| 5,315,821 | A | * | 5/1994 | Dunbar .................. F02K 1/70 244/110 B |
| 5,478,199 | A | * | 12/1995 | Gliebe .................. B64D 33/02 244/1 N |
| 5,952,621 | A | * | 9/1999 | Curtis .................. B64D 33/02 181/213 |
| 5,987,880 | A | * | 11/1999 | Culbertson ............. F02K 1/70 239/265.37 |
| 7,237,378 | B2 | * | 7/2007 | Lardellier ............... F02K 1/48 60/226.1 |
| 7,730,714 | B2 | | 6/2010 | Wood et al. |
| 7,882,694 | B2 | | 2/2011 | Suciu et al. |
| 8,276,362 | B2 | | 10/2012 | Suciu et al. |
| 8,347,633 | B2 | | 1/2013 | Smith et al. |
| 8,459,035 | B2 | | 6/2013 | Smith et al. |

(Continued)

*Primary Examiner* — Andrew Nguyen
(74) *Attorney, Agent, or Firm* — Kinney & Lange, P.A.

(57) ABSTRACT

A gas turbine engine that has a fan case radially surrounding a fan hub, and plural fan exit guide vanes rotatably connected between the fan hub and the fan case. The fan section also has a thrust reverser opening within the case, axially upstream of the guide vanes. The gas turbine engine also has a core case containing a core engine.

18 Claims, 4 Drawing Sheets

(56) References Cited

U.S. PATENT DOCUMENTS

| | | | |
|---|---|---|---|
| 2006/0185346 A1* | 8/2006 | Rolt | F02K 3/06 60/224 |
| 2009/0104022 A1* | 4/2009 | Suljak, Jr. | F01D 17/162 415/160 |
| 2011/0002778 A1* | 1/2011 | Strom | F01D 9/04 415/182.1 |
| 2011/0056208 A1* | 3/2011 | Norris | F02C 3/107 60/772 |
| 2012/0073305 A1* | 3/2012 | Knopfel | F23R 3/346 60/776 |
| 2012/0121375 A1 | 5/2012 | Suciu et al. | |
| 2013/0067885 A1* | 3/2013 | Suciu | F02K 1/70 60/226.2 |
| 2013/0156542 A1 | 6/2013 | Suciu et al. | |
| 2013/0205752 A1* | 8/2013 | Suciu | F02K 3/025 60/226.1 |

\* cited by examiner

PIVOTING BLOCKER DOOR

CROSS-REFERENCE TO RELATED APPLICATION(S)

This application claims priority from U.S. Provisional Application No. 61/895,262, for "PIVOTING BLOCKER DOOR" filed Oct. 24, 2013.

BACKGROUND

The present disclosure relates to a gas turbine engine, and more particularly to a turbofan engine thrust reverser.

Gas turbine engines can include a thrust reverser to redirect engine thrust to reduce landing distance. Thrust reversers typically include articulated doors in a nacelle structure that deploy into a position that obstructs and redirects engine thrust. Clamshell thrust reversers use shells which pivot together to capture and redirect core engine exhaust. Cascade thrust reversers use a translatable sleeve which forms a rearward outer wall portion of a bypass duct which translates rearward to form an outlet with cascade arrays. The sleeve translate rearward upon deployment, and blocking doors hinge radially inwardly to block the bypass duct and redirect bypass airflow through the cascade array. Thrust reverser blocker doors are typically located on the outer diameter of the fan nozzle. The configuration requires drag links that extend into the flow path, and which obstruct bypass flow.

SUMMARY

The present disclosure includes a fan section of a gas turbine engine that has a fan case radially surrounding a fan hub, and plural fan exit guide vanes rotatably connected between the fan hub and the fan case. The fan section also has a thrust reverser opening within the case, axially upstream of the guide vanes.

Similarly, a gas turbine engine that has a fan case radially surrounding a fan hub, and plural fan exit guide vanes rotatably connected between the fan hub and the fan case. The fan section also has a thrust reverser opening within the case, axially upstream of the guide vanes. The gas turbine engine also has a core case containing a core engine.

The present disclosure also relates a reverse flow core gas turbine engine with a fan section defined about a fan axis. The fan section includes a plurality of fan exit guide vanes attached to said fan case, and a thrust reverser cascade within said fan case upstream of the plurality of fan exit guide vanes. A first set of the plurality of fan exit guide vanes are rotatable between a first bypass position and a second blocker position. The reverse flow core gas turbine engine also has a core section defined about a core axis attached to the fan section.

DETAILED DESCRIPTION

Figure 1:
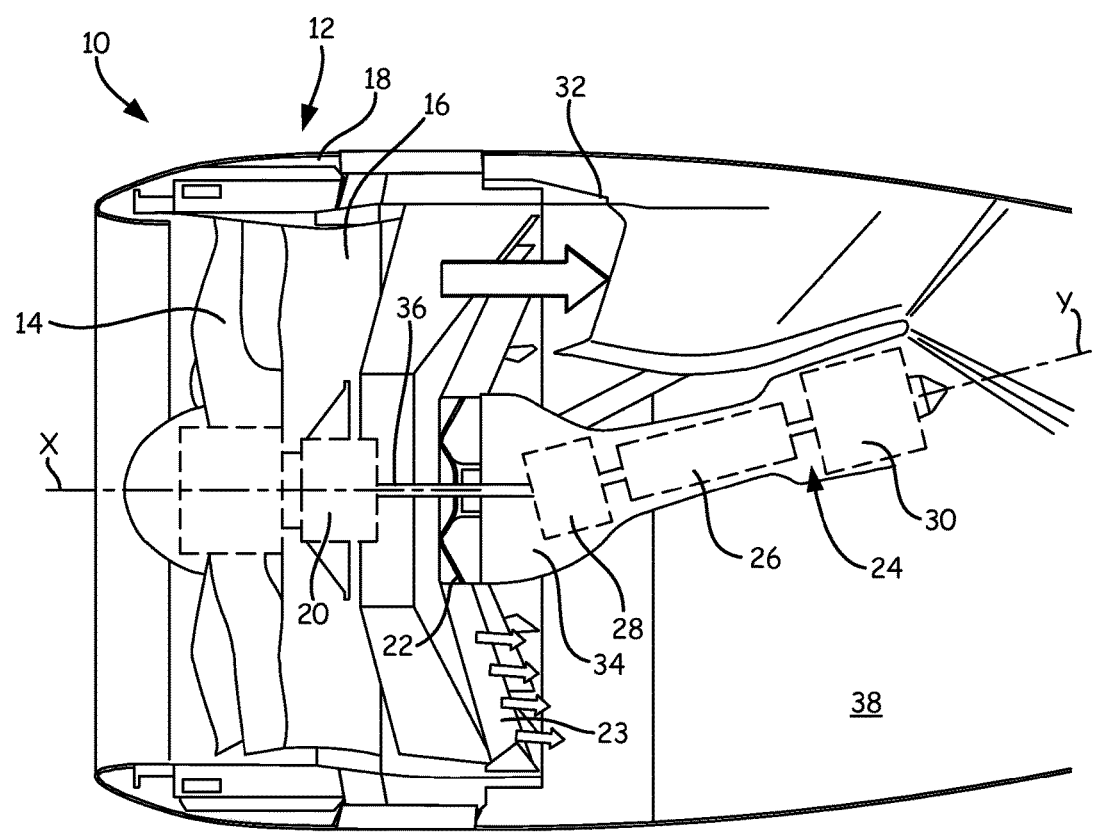
FIG. 1 is a schematic view of a gas turbine engine.

It should be understood that like reference numerals identify corresponding or similar elements throughout the several drawings. It should also be understood that although a particular component arrangement is disclosed in the illustrated embodiment, other arrangements will benefit herefrom.

FIG. 1 is a schematic view of a reverse core engine. The engine 10 includes a propulsor 12 at a forward end which is centered for rotation about an axis X. The propulsor 12 includes a fan 14 and a nozzle 16 rearward thereof surrounded by a nacelle 18. An axis X is also a central axis of the fan and the nozzle. The engine 10 can include a gear reduction 20 driven by a power turbine section 22 to drive the fan 14.

A core engine 24 includes combustion section 26 positioned between a turbine section 28 and a compressor section 30. The core engine 24 can also be referred to as the gas generator of the turbine engine. Air from propulsor 12 passes into an inlet duct 32 to be delivered to the compressor 30 as core air. The duct 32 is disposed over a limited circumferential extent within nacelle 18. At other circumferential locations within nacelle 18, air from propulsor 12 flows as bypass air for propulsion. The core air is compressed and delivered into combustion section 26, where it mixes with fuel and is ignited. Products of this combustion pass through turbine section 28, which drives compressor section 30. The products of combustion then pass through a transition duct 34 over power turbine section 22, to drive the fan 14 that is connected by thereto by a propulsor shaft 36. Air then exits the power turbine 22 and is exhausted therefrom, such as by having a nozzle 23 that directs the flow aftward upon leaving the power turbine 22. The nozzle 23 is the exhaust outlet for the core engine 24.

The illustrated gas turbine engine can be described as a "reverse flow engine" in that the compressor 30 is positioned further into (forward to aft) the engine than is the turbine 28. That is, the turbine section 28 is closest to the propulsor 12, the combustor section 26 and the compressor section 30 are positioned further away in the downstream or aft direction of the propulsor 12 relative to the turbine section 28. Although a reverse flow engine is illustrated, the features and disclosure herein can also relate to other known arrangements of gas turbine engines.

The engine 10 is positioned such that the fan 12, the gear 20, and the power turbine 22 are positioned centered on the fan axis X, while the core engine 24, including the compressor section 30, the combustor section 26, and the turbine section 28, is positioned on a non-parallel engine axis Y. The core engine 24 can be mounted in some manner to the nozzle 16, such as through transition duct 34.

In an engine that is reverse flow, and in particular in one wherein the axes X and Y are not parallel, a relatively long core engine 24 can be achieved without the core engine blocking the exit area 38. However, the overall length of the engine 10 is reduced as the core engine 24 is mounted at an angle with respect to the propulsor 12.

Figure 2:
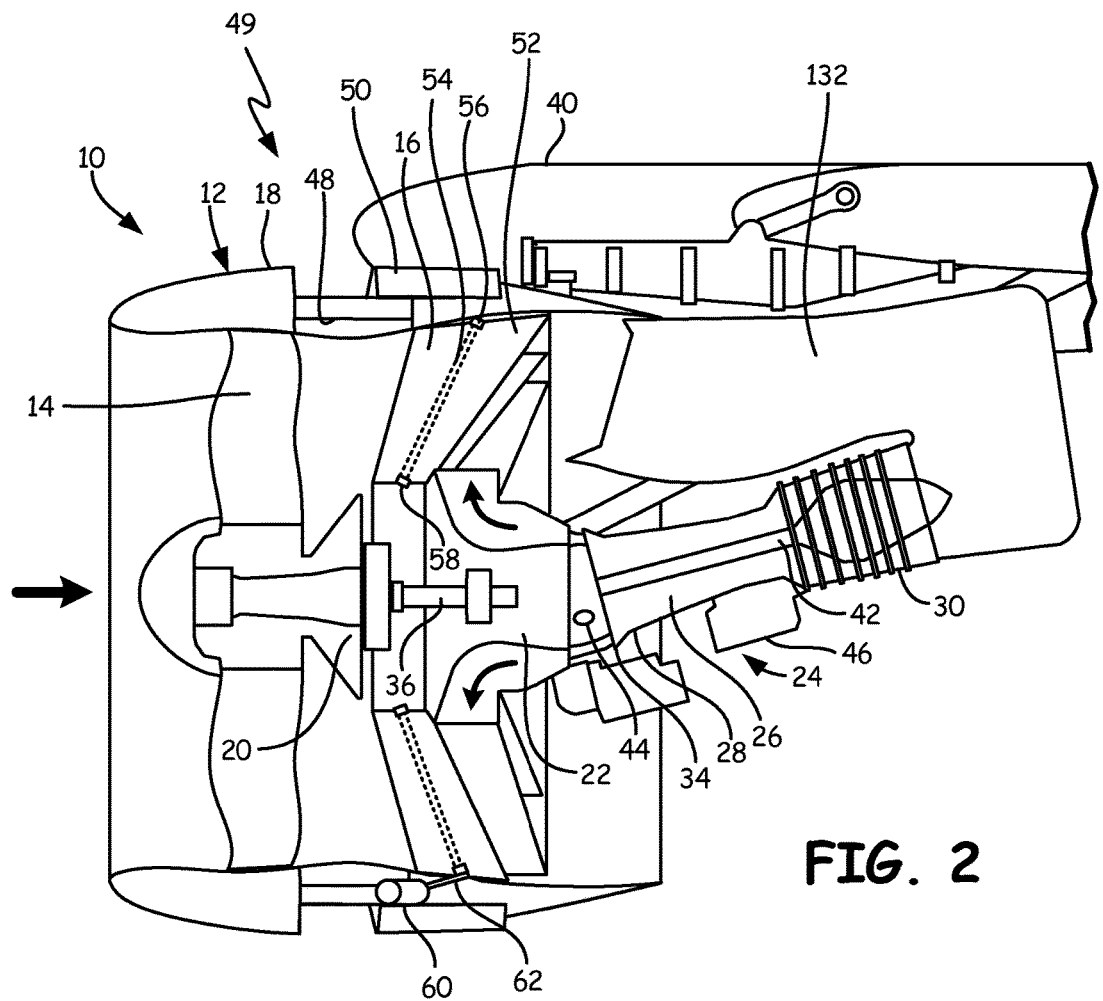
FIG. 2 is a cross sectional view of an engine mounted to an aircraft wing.

FIG. 2 is a cross sectional view of the engine 10 mounted to an aircraft wing 40. Many of the same elements as shown in FIG. 1 are also illustrated in FIG. 2. The inlet duct 32 extends from the propulsor 12 to the compressor section 30 of the core engine 24. The transition duct 34 aerodynamically connects the turbine section 28 of the core engine 24 with the power turbine 22.

During normal operation, gases and airflow leaving the turbine section 28 will flow through the transition duct 34 into the power turbine 22, which will turn the propulsor shaft 36. The gear reduction 20 will change the speed of the propulsor shaft 36 as delivered to the fan 14 so that the fan 14 will run at a different speed than that of the power turbine 22. Typically, the gears are sized to slow the speed of the fan 14 relative to the speed of the power turbine 22.

The transition duct 34 can contain a flow bypass 44. The flow bypass 44 will allow pressurized air from the turbine section 28 to leave the transition duct 34 prior to the power turbine 22. That is, the fan 14 will not run for optimal engine thrust when the flow bypass 44 is open to allow venting of the airflow.

Hardware 46 can be attached to the core engine 24. The hardware can provide the functions that are typical of an auxiliary power unit (APU). The system described eliminates the need for a separate APU on the aircraft. This results in great weight savings, and thus produces a more efficient aircraft as the weight of an aircraft is directly proportional to the fuel burn of an engine. Also, the system is more efficient due to the high pressure ratio of the core engine due to its design for flight.

The flow bypass 44 can be activated during ground operation to bypass the power turbine 22 and allow the engine 10 to operate without using the power turbine 22 and the propulsor 12. Thus, the engine 10 can operate as an APU during ground operation. This removes the requirement for an additional, separate engine to act as the APU on the aircraft.

The engine 10 contains a thrust reverser 49 that includes a translating sleeve 50 and a thrust reverser opening 48. The thrust reverser opening 48 is a structure that permits airflow to exit the fan prior to bypassing the nozzle 16. The thrust reverser opening 48 can be of a cascade design known in the art. In alternate embodiments, the thrust reverser opening 48 is a generally uniform grate that provides structure for the fan case while still allowing airflow therethrough.

The nozzle 16 can be comprised of a plurality of rotatable fan exit guide vanes 52. Each rotatable fan exit guide vane 52 is moveable between a first position that allows for airflow to bypass the fan exit guide vane 52, and a second position that blocks airflow forcing the airflow to exit the thrust reverser opening 48. The fan exit guide vane 52 is rotatable about an axis 54, which can be tangential or perpendicular to the fan axis X (See FIG. 1). The axis 54 can extend radially between two bearings 56 and 58 that permit the rotation of fan exit guide vane 52 with respect to the fan core and the case. An actuator 60 can provide the necessary movement of a mechanical linkage 62 attached to the fan exit guide vane 52, thus facilitating the rotation of the fan exit guide vane 52. The mechanical linkage can be connected to a series or set of the plurality of fan exit guide vanes 52 of the nozzle 16. In such an arrangement, the actuator will synchronize movement of the nozzle between a first bypass position and a second blocker position. In alternate embodiments, multiple actuators can be utilized to move multiple mechanical linkages that connect adjacent fan exit guide vanes 52.

Figure 3:
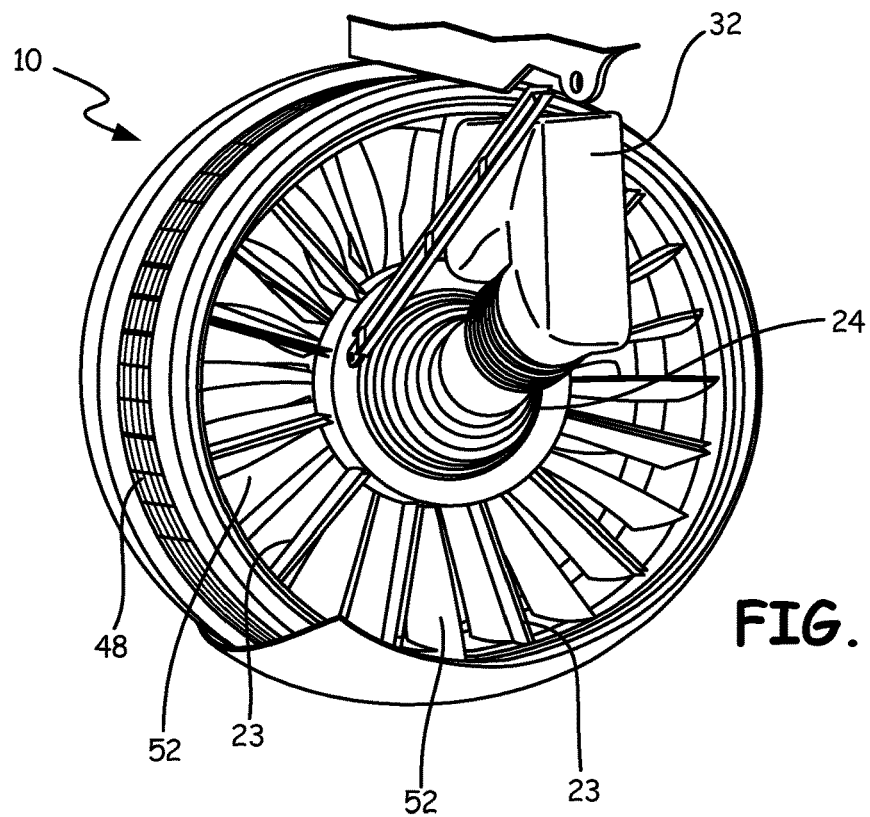
FIG. 3 is a rear perspective view of an engine with the fan exit guide vanes in a first position.
Figure 4:
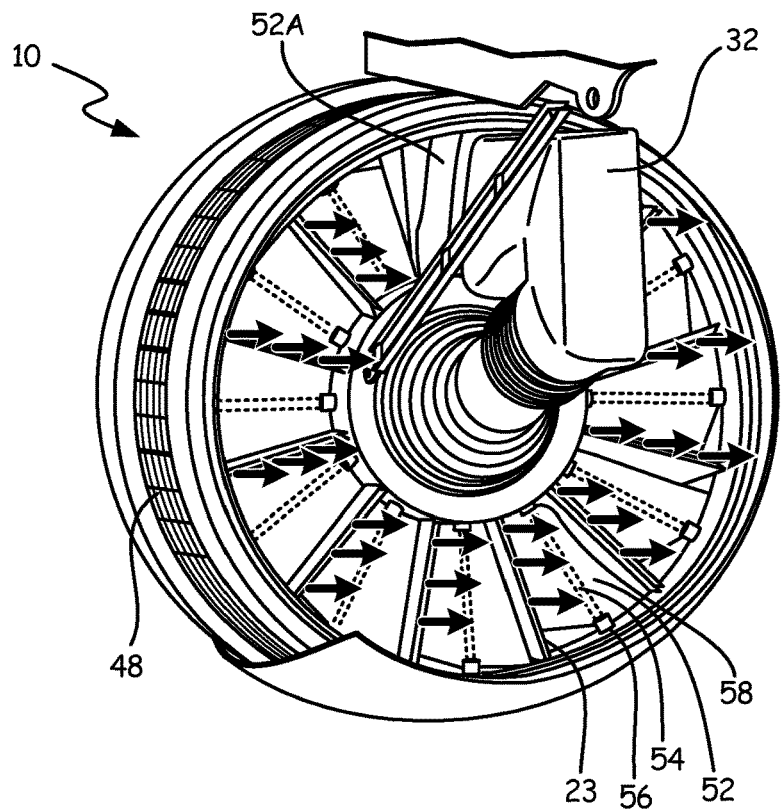
FIG. 4 is a rear perspective view of an engine with the fan exit guide vanes in a second position.

FIG. 3 is a rear perspective view of the engine 10 with the fan exit guide vanes 52 in a first position. FIG. 4 is a rear perspective view of the engine 10 with the fan exit guide vanes 52 in a second position. In FIG. 3, fan exit guide vanes are positioned to permit bypass flow of air through the fan 14. A portion of the air will enter the inlet duct 32 and be delivered to the core engine 24. Exhaust from the core engine 24 will exit exhaust nozzle 23, which is located downstream of the fan exit guide vanes 52.

In FIG. 4, a first set of the fan exit guide vanes 52 have been deployed into a blocking position. In this arrangement, the fan exit guide vanes 52 effectively prevent the free flow of air and redirect the flow, or reverse the flow, out thrust reverser opening 48. Another set of the fan exit guide vanes, e.g. 52A, are not deployed. The fan exit guide vanes 52A in front of the inlet duct 32 remain open to permit flow of air into the inlet or opening of the inlet duct 32, and thus into the core engine 24. The second set of the fan exit guide vanes 52A are not connected to the first set, such as through the mechanical linkage 62 (See FIG. 2). Additionally, the location of the exhaust nozzle 23 downstream from the fan exit guide vanes 52 assure that the fan exit guide vanes 52 acting as blocker doors for thrust reversing do not disturb the core exhaust flow.

Figure 5:
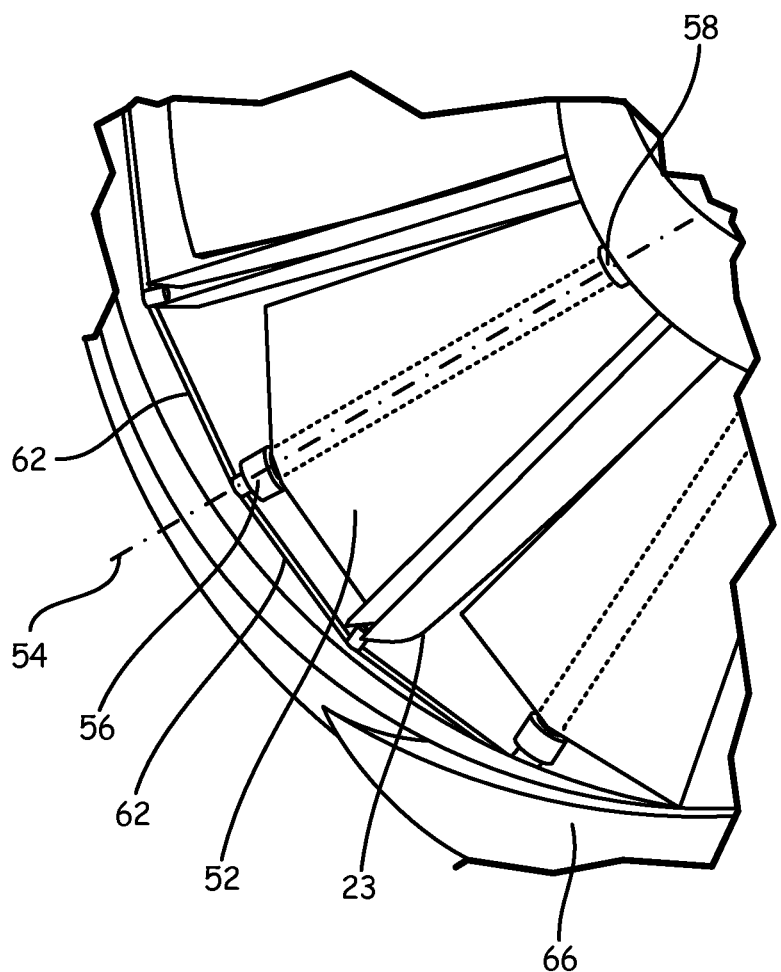
FIG. 5 is a close-up perspective view of the fan exit guide vanes in the second position.

FIG. 5 is a close-up perspective view of the first set of the fan exit guide vanes 52 in the second or blocking position. As previously mentioned, adjacent fan exit guide vanes 52 are connected by linkages 62. As illustrated, fan exit guide vane 52 rotates about the axis 54 between the bearing 58 on the inner diameter or hub of the propulsor 12, and the bearing 56 the outer diameter of the fan case 66. A rod or similar structure can connect the bearings 56 and 58 along the axis 54, with the rod being covered by an airfoil structure. The axis 54 can be centered within the airfoil structure of the fan exit guide vane 52 to provide greater stability, or offset to one side to provide a greater moment of inertia on one edge of the airfoil structure.

With the aforementioned description, a fan exit guide vane that can pivot is provided. The guide vane can rotate about an axis tangential or perpendicular to the axis of the propulsor or fan. The guide vanes can function as thrust blocker doors, without adding separate blocker doors required by known systems. The dual function of the guide vanes eliminates engine components, thus improving the efficiency of the engine. Similarly, by eliminating dedicated blocker doors, the engine contains no exposed drag links to add losses. The disclosed arrangement of a fan contained thrust reverser upstream from the from the fan exit guide vanes will also shortens the space required for the thrust reverser, and thus the engine as a whole.

Discussion of Possible Embodiments

The following are non-exclusive descriptions of possible embodiments of the present disclosure.

The present disclosure includes a fan section of a gas turbine engine that has a fan case radially surrounding a fan hub, and plural fan exit guide vanes rotatably connected between the fan hub and the fan case. The fan section also has a thrust reverser opening within the case, axially upstream of the guide vanes.

The fan section of the preceding paragraph can optionally include, additionally and/or alternatively, any one or more of the following features, configurations and/or additional components:

a plurality of blades axially upstream of the thrust reverser opening;

a ratio of the guide vanes to the blades is greater than one;

a translating sleeve attached to the fan case at the thrust reverser opening;

at least two guide vanes are mechanically connected to each other so that the at least two guide vanes are capable of rotating together;

an actuator connected to the at least two exit guide vanes mechanically connected to each other; and/or a core exhaust outlet axially downstream of the thrust reverser.

Similarly, a gas turbine engine that has a fan case radially surrounding a fan hub, and plural fan exit guide vanes rotatably connected between the fan hub and the fan case. The fan section also has a thrust reverser opening within the case, axially upstream of the guide vanes. The gas turbine engine also has a core case containing a core engine.

The gas turbine engine of the preceding paragraph can optionally include, additionally and/or alternatively, any one or more of the following features, configurations and/or additional components:

a plurality of blades axially upstream of the thrust reverser opening;

the core case has a core axis and the fan case has a fan axis, and whereby the core axis is not parallel to the fan axis;

the core engine comprises a reverse flow engine;

a translating sleeve attached to the fan case;

at least two guide vanes are mechanically connected to each other so that the at least two guide vanes are capable of rotating together;

an actuator connected to the at least two exit guide vanes mechanically connected to each other;

a core inlet axially downstream from the guide vanes;

at least one fan exit guide vanes that is stationary between the fan hub and the fan case;

the core inlet is located adjacent the at least one guide vane that is stationary; and/or a core exhaust outlet axially downstream of the thrust reverser.

The present disclosure also relates to a reverse flow core gas turbine engine with a fan section defined about a fan axis. The fan section includes a plurality of fan exit guide vanes attached to said fan case, and a thrust reverser cascade within said fan case upstream of the plurality of fan exit guide vanes. A first set of the plurality of fan exit guide vanes are rotatable between a first bypass position and a second blocker position. The reverse flow core gas turbine engine also has a core section defined about a core axis attached to the fan section.

The reverse flow core gas turbine engine of the preceding paragraph can optionally include, additionally and/or alternatively, any one or more of the following features, configurations and/or additional components:

the core axis and the fan axis are angled with respect to one another.

Although the present invention has been described with reference to preferred embodiments, workers skilled in the art will recognize that changes can be made in form and detail without departing from the spirit and scope of the invention.

The invention claimed is:

1. A fan section of a gas turbine engine comprising:
a fan case radially surrounding a fan hub;
a plurality of fan exit guide vanes connected between the fan hub and the fan case at a first axial location, wherein the plurality of fan exit guide vanes includes a first set of fan exit guide vanes that are rotatable between an open position and a closed position and a second set of fan exit guide vanes that are fixed in the open position, and wherein the first axial location is disposed axially upstream of a second axial location where an inlet duct of a core engine is disposed, such that a core portion of air passes through the second set of fan exit guide vanes before entering the inlet duct of the core engine; and
a thrust reverser opening within the fan case, axially upstream of the plurality of fan exit guide vanes.

2. The fan section of claim 1, further comprising a plurality of blades axially upstream of the thrust reverser opening.

3. The fan section of claim 2, wherein a ratio of the plurality of fan exit guide vanes to the blades is greater than one.

4. The fan section of claim 1 further comprising a translating sleeve attached to the fan case at the thrust reverser opening.

5. The fan section of claim 1, wherein at least two of the first set of fan exit guide vanes are mechanically connected to each other to allow the at least two guide vanes to rotate together.

6. The fan section of claim 5 further comprising an actuator connected to the at least two exit guide vanes mechanically connected to each other.

7. The fan section of claim 1 further comprising a core exhaust outlet axially downstream of the thrust reverser opening.

8. A gas turbine engine comprising:
a fan case radially surrounding a fan hub;
a plurality of fan exit guide vanes connected between the fan hub and the fan case at a first axial location, wherein the plurality of fan exit guide vanes includes a first set of fan exit guide vanes that are rotatable between an open position and a closed position and a second set of fan exit guide vanes that are fixed in the open position;
a thrust reverser opening within the fan case, axially upstream of the plurality of fan exit guide vanes; and
a core case containing a core engine, the core engine having a compressor, a combustor, a turbine, and a core inlet configured to supply a core portion of air to the compressor, the combustor, and the turbine, the core inlet disposed at a second axial location axially downstream from the first axial location such that the core portion of air passes through the second set of fan exit guide vanes before entering the inlet duct of the core engine.

9. The gas turbine engine of claim 8 further comprising a plurality of blades axially upstream of the thrust reverser opening.

10. The gas turbine engine of claim 8 wherein the core case has a core axis and the fan case has a fan axis, and whereby the core axis is not parallel to the fan axis.

11. The gas turbine engine of claim 8 wherein the core engine comprises a reverse flow engine.

12. The gas turbine engine of claim 8 further comprising a translating sleeve attached to the fan case.

13. The gas turbine engine of claim 8 wherein at least two of the first set of fan exit guide vanes are mechanically connected to each other to allow the at least two guide vanes to rotate together.

14. The gas turbine engine of claim 13 further comprising an actuator connected to the at least two exit guide vanes mechanically connected to each other.

15. The gas turbine engine of claim 8 wherein the core inlet is located adjacent the second set of fan exit guide vanes.

16. The gas turbine engine of claim 8 further comprising a core exhaust outlet axially downstream of the thrust reverser opening.

17. A reverse flow core gas turbine engine comprising:
a fan section defined about a fan axis, the fan section including:
a fan case;
a fan hub;

a plurality of fan exit guide vanes attached between the fan case and the fan hub at a first axial location; and a thrust reverser cascade within said fan case axially upstream of the plurality of fan exit guide vanes;

wherein the plurality of fan exit guide vanes includes a first set of fan exit guide vanes that are rotatable between an open position and a closed position and a second set of fan exit guide vanes that are fixed in the open position; and a core section defined about a core axis, the core section attached to the fan section, a core inlet duct for providing air to the core section, the core inlet duct disposed at a second axial location axially downstream from the first axial location such that a core portion of air passes through the second set of fan exit guide vanes before entering the inlet duct of the core engine.

18. The reverse flow core gas turbine engine of claim 17 wherein the core axis and the fan axis are angled with respect to one another.

\* \* \* \* \*